W. J. HARMON.
TIRE PROTECTOR.
APPLICATION FILED DEC. 15, 1915.
1,205,736.
Patented Nov. 21, 1916.
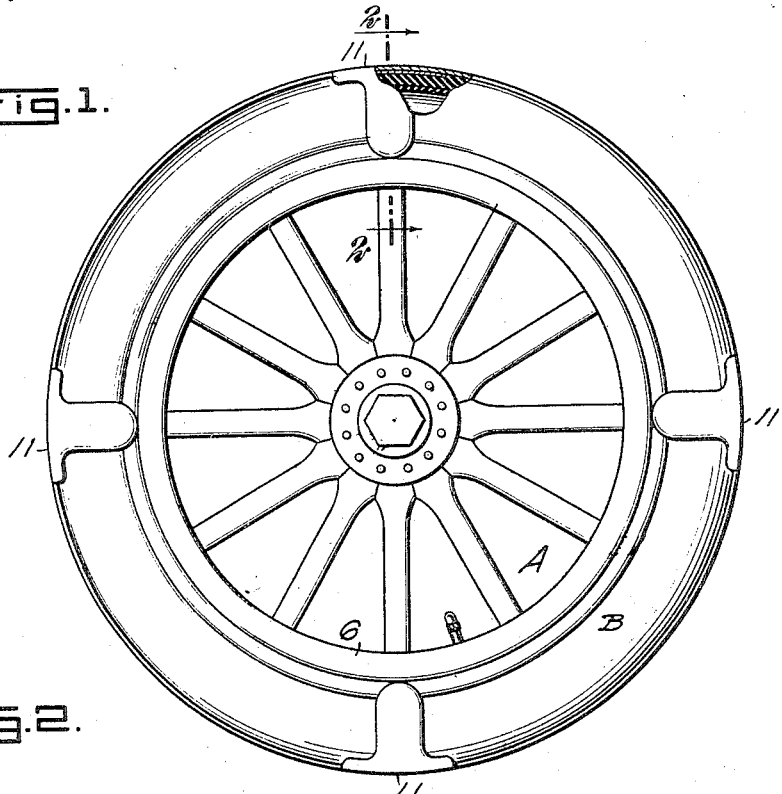
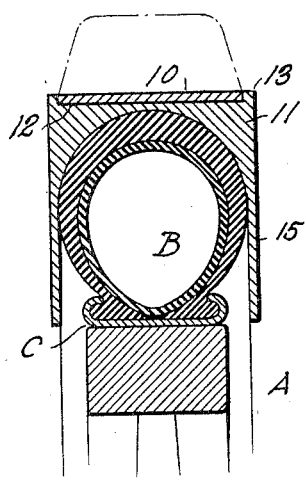
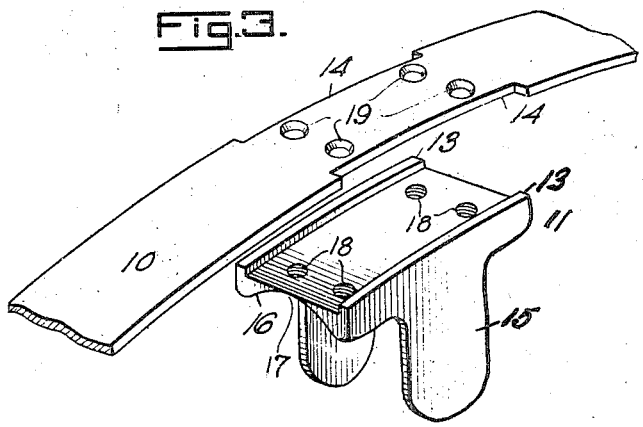
WITNESSES
INVENTOR
Walter J. Harmon
BY
ATTORNEYS

UNITED STATES PATENT OFFICE.

WALTER JOSEPH HARMON, OF ST. LOUIS, MISSOURI.

TIRE-PROTECTOR.

1,205,736.  Specification of Letters Patent.  Patented Nov. 21, 1916.

Application filed December 15, 1915. Serial No. 66,960.

*To all whom it may concern:*

Be it known that I, WALTER J. HARMON, a citizen of the United States, and a resident of St. Louis, State of Missouri, have invented a new and Improved Tire-Protector, of which the following is a full, clear, and exact description.

My invention relates to a type of tire protectors in which an armor in the form of an annular band is disposed about the tire.

The prime object of my invention is to provide a protector and retaining means therefor, of simple form and adapted to be retained in its position by the expansion of the tire.

In carrying out the invention use is made of a flat band to fit over the tire and a plurality of seats for said tire, the seats being in the form of saddles adapted to rest upon and be sustained by a standard tire, there being an interlocking engagement between the saddles and the annular band.

The invention will be particularly explained in the specific description following.

Reference is to be had to the accompanying drawings forming a part of this specification in which similar reference characters indicate corresponding parts in all the views.

Figure 1 is a side elevation of a tire equipped with my improved protector, part being broken away; Fig. 2 is a transverse section on the line 2—2, Fig. 1; and Fig. 3 is a perspective view of one of the saddles and a portion of the protective band.

My invention is applicable to any automobile wheel A having a pneumatic tire, designated by the letter B. The protector includes a continuous annular band 10 adapted to fit over the tire B. The width of the band 10 may vary according to the character of the tire, being made wider or narrower than the tire as desired.

In connection with the protective band 10, I employ a series of saddles 11, disposed at separated locations about the band, four being shown in the present instance. Each saddle presents a seat 12 at the outer face thereof for receiving the band 10.

In order to effect interlocking engagement between the saddles 11 and the protective band 10, I form on each saddle, at the sides thereof, longitudinal ribs 13, and in the side edges of the band 10, I form corresponding recesses 14, to receive the said ribs, the recesses presenting shoulders at the ends to prevent relative peripheral movement of the band and saddles.

The saddles are formed to have guided engagement with the tire B at the sides, for which purpose tongues 15 extend radially inward at the inner side of each saddle. The tongues are preferably of a length to extend inwardly to overlap the clencher means C, or equivalent devices employed, to retain the tire on the wheel A.

The inner side of each saddle 11 is rounded transversely to conform to the transversely rounding surface of the tire B.

By the described construction, the protector will be prevented from displacement without the employment of fastening means connecting with the wheel rim or spokes.

The under side of each saddle 11 is beveled at the outer end as will be observed by comparing the comparatively thin end edge at 17, Fig. 3, with the central cross section, Fig. 2, of the saddle whereby to obtain a snug fit of the saddle between the protective band 10 and the pneumatic tire. If desired, the saddle may be provided with tapped holes 18 and the band 10 with corresponding holes 19 to receive fastening screws (not shown).

Having thus described my invention I claim as new, and desire to secure by Letters Patent:

A tire protector including an annular band having recesses in the side edges thereof, and a series of separate saddles having on the outer face thereof at the sides, ribs extending radially outward and fitting the recesses of the band, the inner sides of the saddles being adapted to fit over a tire and there being tongues at the sides of the saddles and extending radially inward, said tongues having a radial depth to extend beyond the base of the tire and overlap the sides of the wheel rim.

In testimony whereof I have signed my name to this specification in the presence of two subscribing witnesses.

WALTER JOSEPH HARMON.

Witnesses:
 FRED. G. SEIDEL,
 WM. J. WALSH.